C. BERGER.
SUBMARINE SIGNAL RECEIVING APPARATUS.
APPLICATION FILED NOV. 4, 1912.
1,101,830.
Patented June 30, 1914.
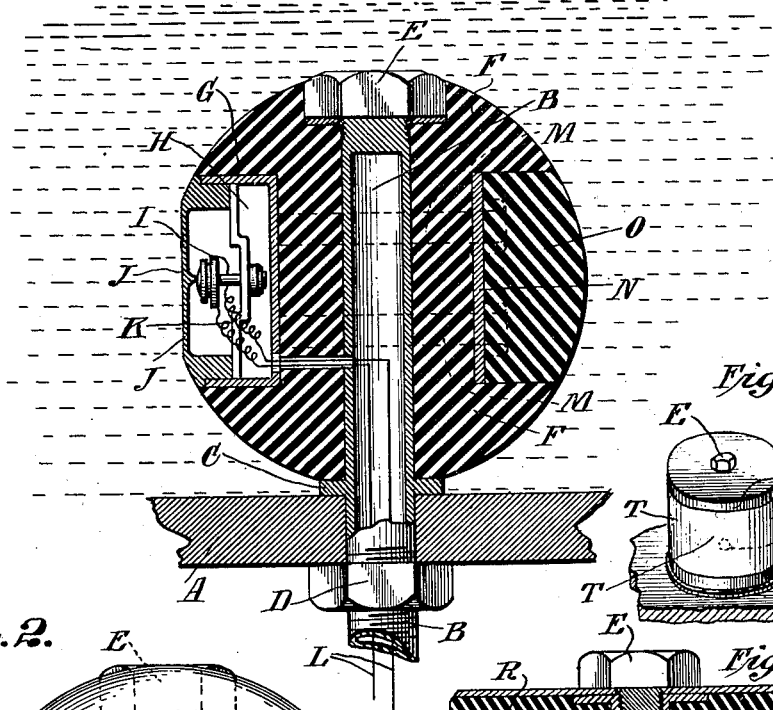
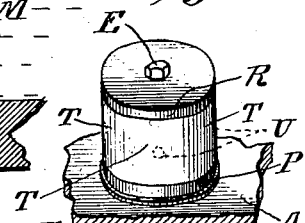
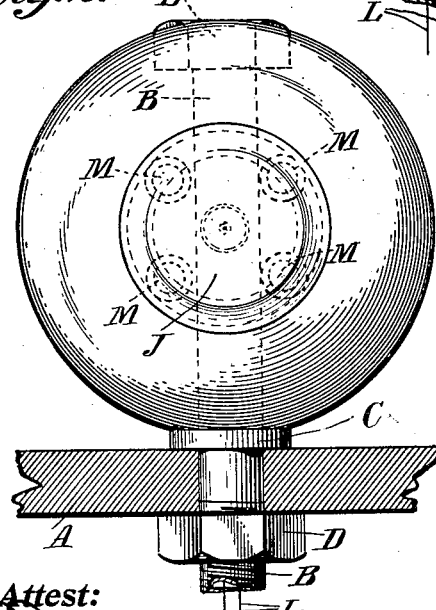
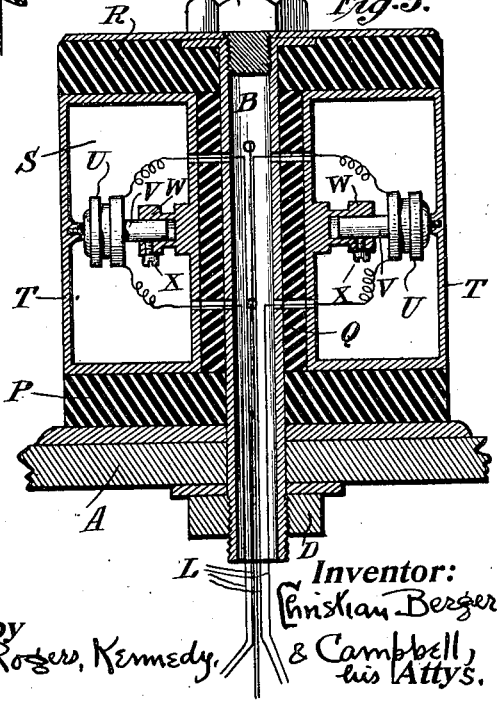
Attest:
J. G. Mitchell
E. B. King
Inventor:
Christian Berger,
by Rogers, Kennedy, & Campbell,
his Attys.

UNITED STATES PATENT OFFICE.

CHRISTIAN BERGER, OF NEW YORK, N. Y., ASSIGNOR TO SUBMARINE WIRELESS COMPANY, A CORPORATION OF NEW YORK.

SUBMARINE SIGNAL-RECEIVING APPARATUS.

1,101,830.   Specification of Letters Patent.   Patented June 30, 1914.

Application filed November 4, 1912. Serial No. 729,536.

*To all whom it may concern:*

Be it known that I, CHRISTIAN BERGER, a subject of the King of Hungary, residing at New York city, in the county of New York and State of New York, have invented certain new and useful Improvements in Submarine Signal-Receiving Apparatus, of which the following is a specification, reference being had therein to the accompanying drawing.

My invention relates to improvements in submarine signal receiving apparatus, and more particularly to a receiving apparatus adapted to be mounted exterior to a vessel and submerged in open water.

It has long been recognized that the most efficient location for a vibration-receiving apparatus is immediately in the open water exterior to a ship or vessel, but heretofore no completely satisfactory apparatus has been devised for meeting this condition, and considerable effort has been devoted to the devising of an interiorly located apparatus. A microphone mounted in an ordinary manner at the exterior of a ship is subject not merely to the objection of interference from vibrations occurring within the ship, but it is further, on account of the ship's motion through the water, subject to several disadvantages, including the vibratory action which frequently occurs when a body is drawn through the water, and the strain and possible injury from the same source.

It is an object hereof to provide an efficient and durable exterior receiving apparatus free from the objections above noted.

Other objects hereof will appear during the hereinafter following description or will be obvious to those acquainted with the art to which the invention pertains.

I will first describe one or more forms in which the present improvement may be embodied, and will thereafter point out the novel features in the claims.

In the accompanying single sheet of drawings forming a part hereof, Figure 1 is a central cross-section of a submarine signal-receiving apparatus embodying my improvements, and a portion of the shell or superstructure or outer structure of a ship or other vessel to which the invention is applied. Fig. 2 is a left-hand elevation of the instrument seen in Fig. 1. Fig. 3 shows a central cross-section of a different embodiment or modification of the improvements seen in Figs. 1 and 2. Fig. 4 is a reduced perspective view of the apparatus shown in Fig. 3.

Similar letters of reference designate corresponding parts in the several figures of the drawings.

The shell or any other exterior portion A of the ship or vessel is indicated as that to which the apparatus of the present invention is applied. While the part A may be considered as the vertical side wall of a ship, in which case Figs. 1 and 3 will be horizontal sections, the part A may on the other hand be considered as a horizontal portion, for example, the upper side of the shell of a submarine, which becomes submerged when the vessel travels beneath water. Ordinarily a submarine boat is provided with a superstructure which becomes flooded when the vessel dives, and the apparatus hereof may conveniently be located within the flooded superstructure, thus giving additional protection from injury, although if desired it might be mounted at the upper side of the superstructure so that sound vibrations received from a distance would be less impeded.

Wherever or in whatever attitude the instrument hereof may be placed, it is shown in all the embodiments as comprising in combination an insulating body composed, for example, of soft rubber or other insulating material, together with a sound-sensitive device such as the ordinary microphone supported wholly by said insulating body, the apparatus constructed and arranged so as to be mounted as aforesaid at the exterior of the vessel and submerged in open water.

It is further true of both illustrated embodiments that combined with the insulating body and the sound-sensitive device is a rigid core or frame adapted to be mounted or secured directly to the exterior part A of the ship or vessel and serving to support the insulating body which in turn carries the sound-sensitive device, the three being mutually secured together so that the device is insulated from the frame. In addition the whole is constructed, arranged and designed to have a generally rounded contour or exterior which is rendered possible by reason of the features shown and hereinafter described.

By the combination and arrangement above set forth, an apparatus is provided wherein sound vibration signals are most efficiently received, while the sensitive-device is insulated against vibrations from the interior and is practically insulated or protected from the vibrations of water action; the bed or elastic material or rubber at the same time serving to break the force of physical blows from objects in the water to the additional protection of the apparatus from injury.

Referring now first to Figs. 1 and 2, I will describe how the improvement therein illustrated may be constructed.

A hollow stud B projecting outwardly from the portion A of the ship forms a rigid core or frame. This hollow stud may be secured to the ship through the provision of a collar C near the inner end of the stud, opposed by a nut D on the opposite side of the part A so that on tightening the nut D the stud B becomes a rigidly projecting part.

At the upper end of the stud B may be employed a lock nut E of proper size and shape that when screwed in place it will securely hold against displacement the portion or block of rubber F. This block F may be composed of red Para rubber of the best quality, although other sound deadening materials might be employed, and in any case its general form will be rounded, it being shown, for example, in the form of a sphere recessed for the reception of the stud B, the nut E and the sensitive-device. By the employment of an insulating material of this kind, while vibrations of slow frequency or of large amplitude might be communicated, short rapid vibrations such as sound vibrations will be effectively insulated, and therefore the noises within a ship will be prevented from access to the insulated sensitive-device or microphone.

While the sound-sensitive device or microphone might be supported in various modes by the insulating body, it is shown in Fig. 1 as embedded therein, the latter being provided with a lateral recess at G in which the sensitive-device including the casing H is fitted and secured. The microphone I of ordinary construction is located within the casing H and suitably mounted or held at its rear side, for example as shown. At the front or outer side of the casing H is shown a diaphragm or vibratable plate J which may constitute a part of the casing. This plate or diaphragm constitutes an exterior wall of the instrument, and one which is arranged and shaped so as to stand flush with the exterior of the apparatus or substantially in line with the surface of the rubber block F. This diaphragm or wall J is in direct contact with open water and therefore in the most effective situation for receiving signal vibrations, and at its interior or dry side it is connected with the front end of the microphone I so as to coöperate with the microphone, in a well understood manner, to vary the resistance and current in a closed electric circuit. A bridge or piece K may be employed within the casing, upon which the microphone is mounted fixedly or otherwise, so as to permit its operation by the vibratory plate J.

The purpose of constituting the core B in the form of a hollow stud will now be perceived. From the opposite contacts of the microphone extend the wires L, L, which pass through suitable apertures into the interior of the hollow stud and by way of the same into the interior of the ship or vessel, whence the wires may be connected up to a receiver or other instrument in any well known manner. In order to securely hold the microphone casing H embedded in the rubber block F, four cross bolts M may be employed extending directly from the casing H through the rubber block on either side of the central stud B to where at the opposite side a plate N may be provided, each of the bolts M having a nut bearing on the opposite side of the plate N. To admit the plate N, the rubber block may be recessed, and after the assemblage of the parts a supplementary piece of rubber O may be inserted in such recess so as to cover the bolt heads or nuts and fill out and restore the rounded or spherical contour of the apparatus.

In place of the inserted piece or block of rubber O, another microphone and casing H might be located in the recess, thus affording opposed instruments sensitive to sound from opposed directions; and likewise a different plural number of instruments might be arranged facing in various directions as desired, so that the operator can selectively switch into operation the instrument which most efficiently receives and transmits the signals sought to be interpreted. In the modification of Figs. 3 and 4 next to be referred to, a plural number of instruments is actually shown.

Instead of a single block or sphere of rubber as in Fig. 1, the insulating body may be built up of a plurality of cylinders or slabs of rubber P, Q, R, as in Figs. 3 and 4, so as to present a rounded or cylindrical exterior contour. By such an arrangement I am enabled to employ the advantageous feature of an annular box or chamber S supported by the insulating body out of contact with the metallic core or frame B, and yet flush as regards its outer vibratory wall T with the exterior of the apparatus.

Within the annular box or chamber S, may be provided any desired number of microphones U, U, facing as desired. Two of these are shown in Fig. 3, a third being indicated by the wire passages in the core B, while Fig. 4 indicates that the several microphones are spaced from each other at quadrants. In any such arrangement the conductors or wires L, L may be led as before into the interior of the core B and thus into the vessel. These connections are shown diagrammatically in Fig. 3, and in practice the wires would be grouped rather than brought through a number of independent passages or holes.

Each of the microphones U is shown as having a cylindrical stud V secured in a holder or sleeve W by means of a set screw X, so as to secure proper operative relation between microphone U and the exterior vibratory wall T.

While in Fig. 1 the part E is shown as a nut for tightening the block in position, it is shown in Fig. 3 as the head of a screw plug which may be removed to give access to the core interior, the upper end of the core or stud in this case having an integral flange as shown, to give an upper bearing surface upon the rubber slab R.

By the above described constructions, it will be seen that the objects and advantages hereinbefore referred to are attained.

Since it is obvious that many of the disclosed features of arrangement, construction and combination may be departed from without altering the principles of the invention, I do not wish to be restricted to such features excepting as set forth in the appended claims.

What I claim and desire to obtain is:—

1. A submarine signal receiving apparatus comprising in combination an insulating body composed of sound insulating material, a rigid core or frame adapted to be mounted exterior to a ship or vessel and to support said insulating body, and a sound-sensitive device carried by said insulated body, the said body, frame and device being mutually secured together so that said device is insulated from said frame.

2. A submarine signal receiving apparatus comprising in combination an insulating body composed of sound insulating material, a rigid core or frame adapted to be mounted exterior to a ship or vessel and to support said insulating body, and a sound-sensitive device carried by said insulated body, the said body, frame and device being mutually secured together so that said device is insulated from said frame, and the whole having a generally rounded contour or exterior.

3. A submarine signal receiving apparatus comprising in combination an insulating body composed of sound insulating material, a rigid core or frame adapted to be mounted exterior to a ship or vessel and to support said insulating body, and a sound-sensitive device consisting of a microphone within a walled chamber, carried by said insulated body, the said body, frame and device being mutually secured together so that said device is insulated from said frame.

4. A submarine signal receiving apparatus comprising in combination an insulating body composed of sound insulating material, a rigid core or frame adapted to be mounted exterior to a ship or vessel and to support said insulating body, and a sound-sensitive device consisting of a microphone within a walled chamber, carried by said insulated body, the said body, frame and device being mutually secured together so that said device is insulated from said frame, and the whole having a generally rounded contour or exterior, with the exterior wall of said chamber flush with said insulating body.

5. A submarine signal receiving apparatus comprising in combination an insulating body composed of sound insulating material, and having a lateral recess, a rigid core or frame adapted to be mounted exterior to a ship or vessel and to support said insulating body, and a sound sensitive device carried in the recess of said insulated body, the said body, frame and device being mutually secured together so that said device is insulated from said frame, and the whole having a generally rounded contour or exterior.

6. A submarine signal receiving apparatus comprising in combination an insulating body composed of sound insulating material, and having a lateral recess, a rigid core or frame adapted to be mounted exterior to a ship or vessel and to support said insulating body, and a sound-sensitive device comprising a walled chamber carried in the recess of said insulated body, the said body, frame and device being mutually secured together so that said device is insulated from said frame, and the whole having a generally rounded contour or exterior.

7. A submarine signal receiving apparatus comprising in combination an insulating body composed of sound insulating material, a rigid core or frame adapted to be mounted exterior to a ship or vessel and to support said insulating body, said core or frame being hollow for the passage of conductors, a sound-sensitive device carried by said insulated body, the said body, frame and device being mutually secured together so that said device is insulated from said frame, and conductors from said device through said core or frame into the vessel's interior.

8. A submarine signal receiving apparatus comprising in combination an insulating body composed of sound insulating material having a rounded form, a rigid core or frame adapted to be mounted exterior to a ship or vessel and to support said insulating body, a walled annular chamber carried by said insulated body, the said body, frame and chamber being mutually secured together so that said chamber is insulated from said frame, and a microphone within and connected to the wall of said chamber.

9. A submarine signal receiving apparatus comprising in combination an insulating body composed of sound insulating material having a rounded form, a rigid core or frame adapted to be mounted exterior to a ship or vessel and to support said insulating body, a walled annular chamber carried by said insulated body, the said body, frame and chamber being mutually secured together so that said chamber is insulated from said frame, and a plurality of microphones within and connected to different sides of the exterior wall of said chamber.

In testimony whereof I affix my signature in presence of two witnesses.

CHRISTIAN BERGER.

Witnesses:
  JOHN H. DANIELS,
  JOHN M. RUSSELL.

---

Correction in Letters Patent No. 1,101,830.

It is hereby certified that in Letters Patent No. 1,101,830, granted June 30, 1914, upon the application of Christian Berger, of New York, N. Y., for an improvement in "Submarine Signal-Receiving Apparatus," an error appears in the printed specification requiring correction as follows: Page 1, line 87, after the word "other" insert the word *sound*; and that the said Letters Patent should be read with this correction therein that the same may conform to the record of the case in the Patent Office.

Signed and sealed this 8th day of September, A. D., 1914.

[SEAL.]

J. T. NEWTON,
*Acting Commissioner of Patents.*